United States Patent
McGuyer

(10) Patent No.: US 7,320,415 B2
(45) Date of Patent: Jan. 22, 2008

(54) CONDIMENT DISPENSING CONTAINER AND CAROUSEL

(75) Inventor: Carter W. McGuyer, Muscle Shoals, AL (US)

(73) Assignee: Robbins Industries, Inc., Florence, AL (US)

( * ) Notice: Subject to any disclaimer, the term of this patent is extended or adjusted under 35 U.S.C. 154(b) by 632 days.

(21) Appl. No.: 10/829,174

(22) Filed: Apr. 22, 2004

(65) Prior Publication Data

US 2005/0011912 A1   Jan. 20, 2005

Related U.S. Application Data

(63) Continuation-in-part of application No. 10/699,234, filed on Oct. 31, 2003, now Pat. No. 7,083,070.

(60) Provisional application No. 60/467,815, filed on May 2, 2003.

(51) Int. Cl.
*A47G 19/012* (2006.01)
*B67D 5/006* (2006.01)
*A45D 24/022* (2006.01)

(52) U.S. Cl. .............. 222/142.3; 222/179.5; 222/181.1; 222/197; 222/370

(58) Field of Classification Search ............ 222/39, 222/142.1, 142.3, 179.5, 181.1, 181.3, 197, 222/196.2, 158, 237, 239, 480, 557, 370
See application file for complete search history.

(56) References Cited

U.S. PATENT DOCUMENTS

| | | | | |
|---|---|---|---|---|
| 1,204,111 A | * | 11/1916 | Anderson | 222/239 |
| 1,468,534 A | * | 9/1923 | Lang | 222/196.2 |
| 1,654,050 A | * | 12/1927 | Page | 222/445 |
| 1,906,837 A | * | 5/1933 | Brochu | 222/100 |
| 1,944,447 A | * | 1/1934 | McVicker | 222/239 |
| 1,966,326 A | * | 7/1934 | Wentorf | 222/360 |
| 2,484,148 A | * | 10/1949 | Beatty et al. | 222/196.2 |
| 3,522,902 A | * | 8/1970 | Katz | 222/370 |
| 4,183,443 A | * | 1/1980 | DeParales et al. | 220/714 |
| 4,700,850 A | | 10/1987 | Morgan et al. | |
| 5,490,615 A | | 2/1996 | Robbins et al. | |
| D392,852 S | | 3/1998 | Weterrings et al. | |
| D402,849 S | | 12/1998 | Weterrings et al. | |

(Continued)

FOREIGN PATENT DOCUMENTS

GB   3002855   4/2002

OTHER PUBLICATIONS

Handy Spice Instructions Brochure.

*Primary Examiner*—Kevin Shaver
*Assistant Examiner*—Melvin A. Cartagena
(74) *Attorney, Agent, or Firm*—Kramer Levin Naftalis & Frankel; Gregor N. Neff

(57) ABSTRACT

Substantially cylindrical condiment containers with extendable and retractable pouring spouts are provided. A dispensing mechanism in each container can be actuated by simply rotating the lower portion of the body of the container, without the need for separate knobs or levers. The dispensing mechanism uses a stainless steel ring-shaped spring in a detent structure which properly aligns an outlet opening with a compartment from which material is to be dispensed, creates a discernable "click" to indicate proper alignment, and serves as a ratchet to prevent rotation of the mechanism in the wrong direction.

16 Claims, 7 Drawing Sheets

U.S. PATENT DOCUMENTS

| | | |
|---|---|---|
| D403,923 S | 1/1999 | Weterrings et al. |
| D407,610 S | 4/1999 | Weterrings et al. |
| 5,931,356 A | 8/1999 | Lillelund et al. |
| 6,182,839 B1 | 2/2001 | Robbins et al. |
| 6,283,339 B1 | 9/2001 | Morrow |
| 6,308,838 B1 | 10/2001 | Endean |
| D464,533 S | 10/2002 | McGuyer |
| 6,591,993 B2 | 7/2003 | Humphrey |

* cited by examiner

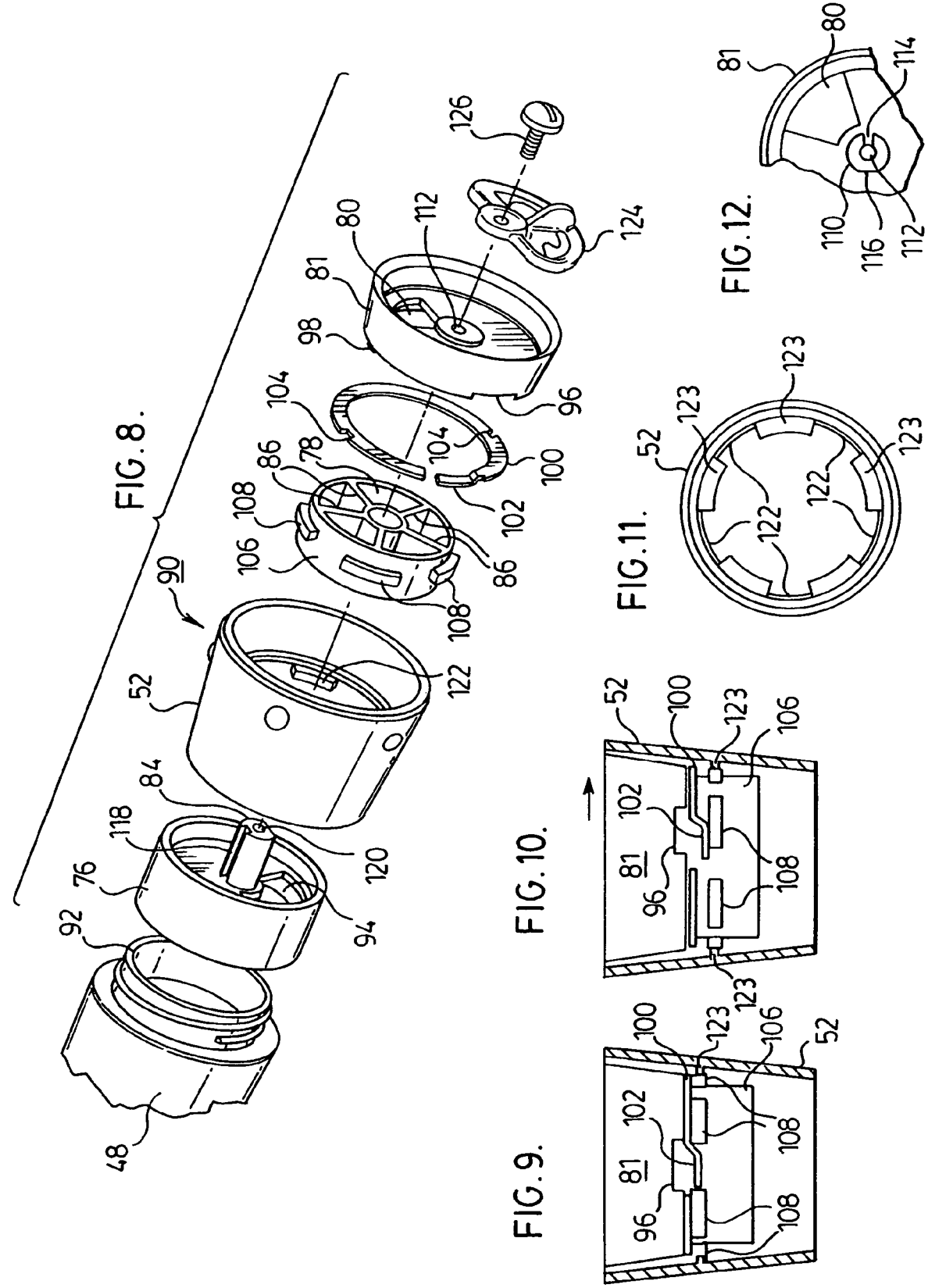

CONDIMENT DISPENSING CONTAINER AND CAROUSEL

This invention relates to dispensing containers, and particularly to condiment dispensing containers, and to carousels for storing and organizing such containers. Priority is claimed from U.S. Provisional Patent Application Ser. No. 60/467,815, filed May 2, 2003. This application is a continuation-in-part of U.S. patent application Ser. No. 10/699,234, filed Oct. 31, 2003 now U.S. Pat. No. 7,083,070.

Condiment dispenser carousels such as those sold by Robbins Industries, Inc., the assignee of this patent application, have become very popular. Such carousels store different spices in wedge-shaped dispensing containers which can be used to dispense automatically pre-measured quantities through the bottom, or unmeasured quantities through openings in the top.

It is an object of the present invention to provide a device of the same type which uses dispensing containers of a shape and size which makes them especially easy to handle.

It is another object to provide such dispensing containers are relatively simple in construction and easy to use.

It is another object of the invention to provide a carousel device which is relatively sturdy and yet inexpensive to manufacture.

It is a further object of the invention to provide a dispensing container which is suitable not only for use with a carousel for storing it, but also as an easy-to-use stand-alone condiment dispenser for use on the table or elsewhere, wherever needed.

It is a further object of the invention to provide a carousel device which easily can be stacked on top of another carousel and locked in place without the use of tools or extra components.

In accordance with the present invention, the foregoing objects are satisfied by the provision of a dispensing container and carousel in which the container has an extendable and retractable dispensing spout.

The container can have a substantially cylindrical shape, instead of the more usual wedge shape, and is relatively easy to handle. The container can be used easily as a stand-alone condiment dispenser on the table or wherever needed. It can be used in many combinations with other dispensers, such as a pepper mill made to look like the dispenser, etc.

The container has a pre-measured dispensing mechanism which can be rotated simply by turning a portion of the body of the container. No additional levers or knobs are needed.

The container also has a construction which is relatively simple to manufacture and is durable to resist wear and give long service.

The carousel construction is reduced in cost by the provision of a plurality of upstanding struts or rods which are used to form a central projection for rotatably supporting the container.

The carousel unit is made easily stackable with one or more other carousel units. This is done by using a first locking mechanism to releasably attach the central projection of the carousel to the base member, and providing a second locking mechanism at the top of the central projection. The base member from one unit is removed and its central projection is locked into the upper locking mechanism of the other unit. This permits the units to be stacked atop one another without the use of tools or extra parts.

The foregoing and other objects and advantages of the invention will be set forth in or apparent from the following description and drawings.

IN THE DRAWINGS:

FIG. 8 is an exploded perspective view of another dispensing mechanism of the present invention;

FIGS. 9 and 10 are cross-sectional views of a portion of the mechanism shown in FIG. 8, with the mechanism in different operative positions;

FIG. 11 is a bottom plan view of one part of the mechanism of FIG. 8; and

FIG. 12 is a broken-away top plan view of a component of the FIG. 8 structure.

GENERAL DESCRIPTION

Figure 1:
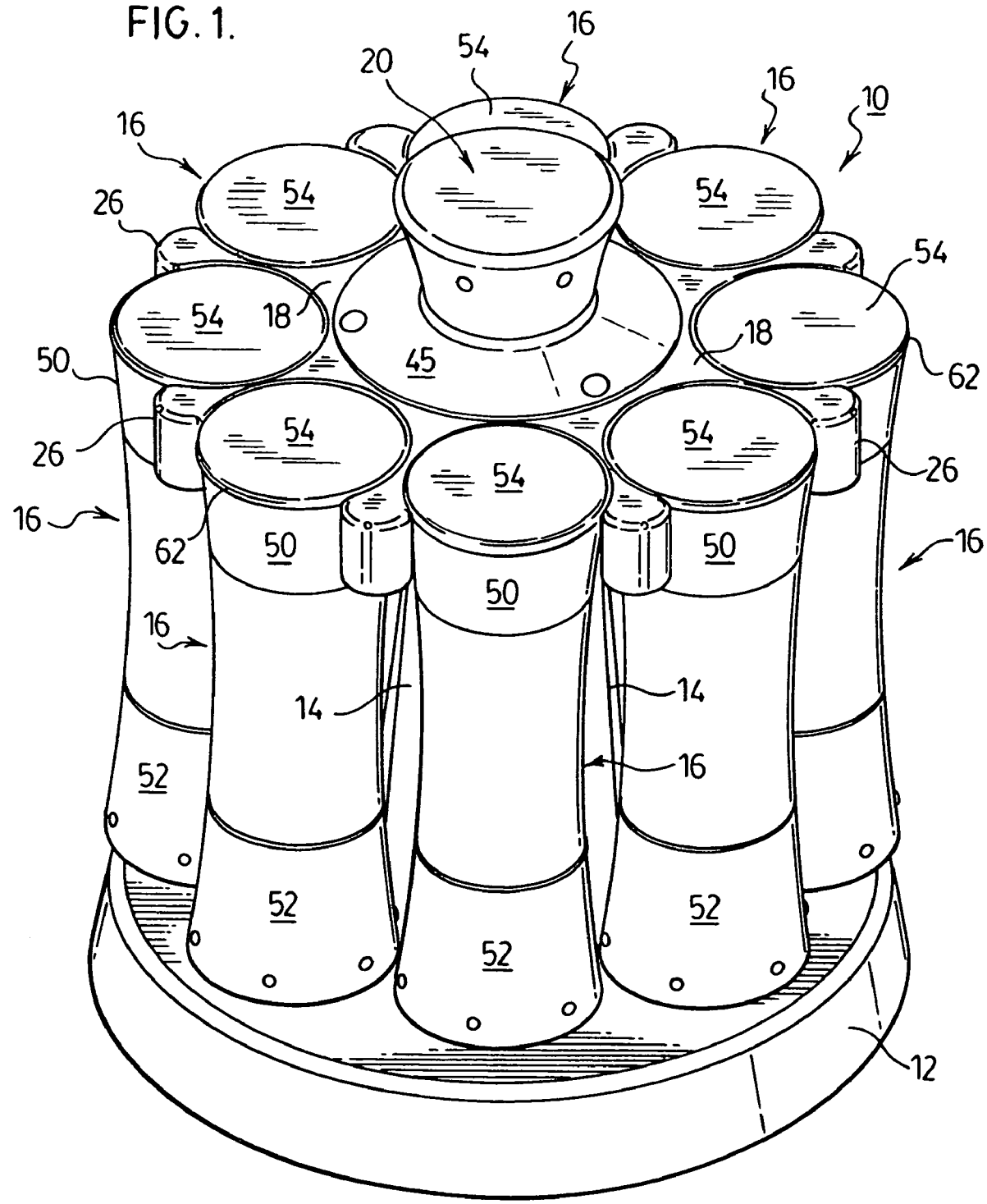
FIG. 1 is a perspective view of the preferred embodiment of the present invention.

FIG. 1 shows the condiment dispensing carousel 10 of the present invention. The carousel includes a base member 12, and a plurality of rod-shaped vertical struts 14 arranged in a circular pattern to form a central vertical projection from the base member 12. Several dispensing containers 16 are supported on a holding structure 18 which is rotatably mounted on the central projection so that the containers can be rotated to facilitate location of a desired container.

A handle structure 20 is secured to the holding structure 18 to provide a means for easily lifting the carousel.

Figure 2:
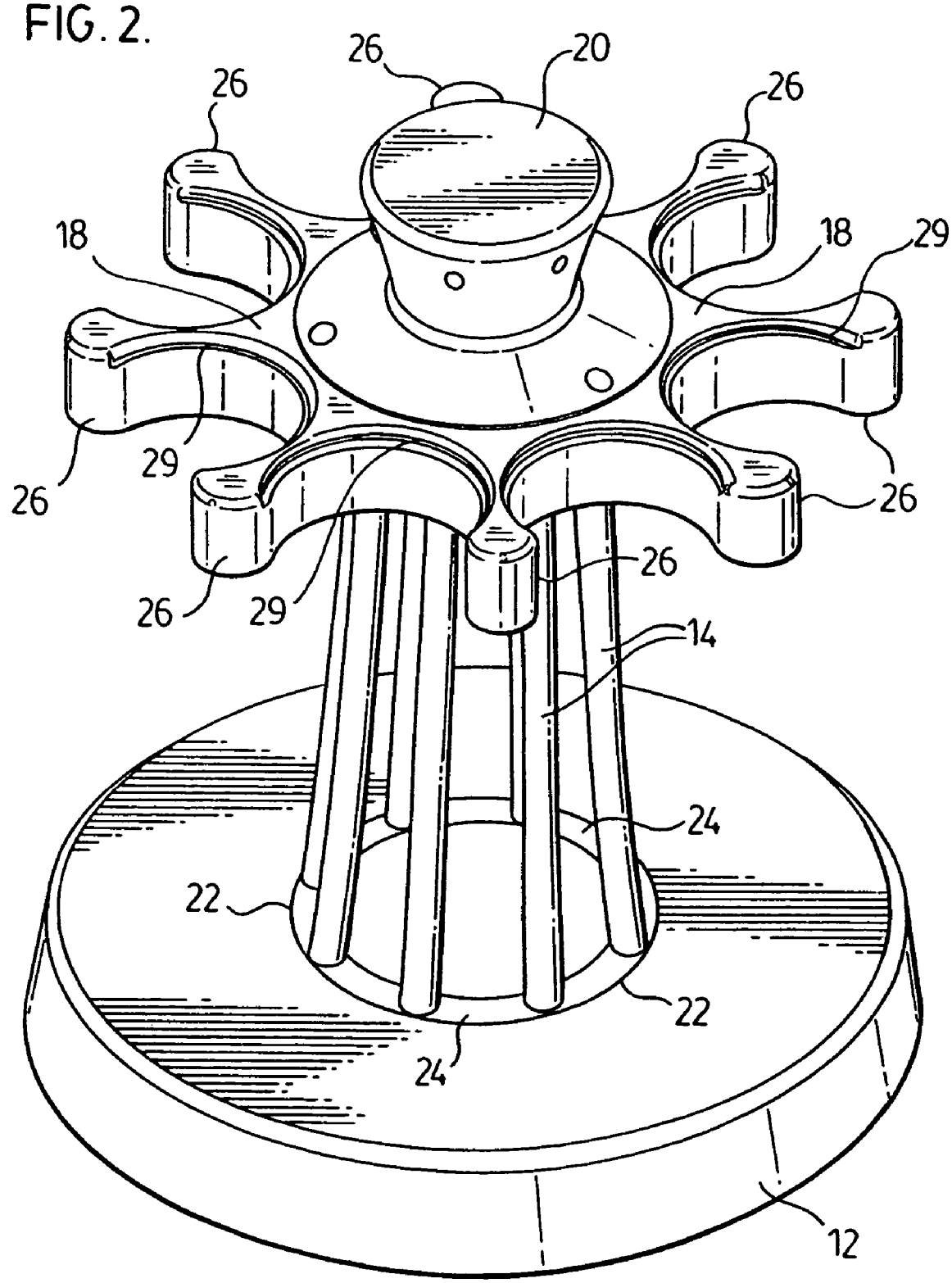
FIG. 2 is a perspective view of the structure of FIG. 1 with the dispensing containers removed.

Referring now to FIG. 2, the carousel structure includes a ring 24 securing the lower ends of the struts 14 together. The ring is fastened to the base 12 by means of a releasable locking structure including a circular groove 22 in the base member 12 with locking tab receptacles 27 (FIG. 3), and locking tabs 25 on the ring 24 which fit into the receptacles when the ring 24 is inserted into the groove 22 and twisted. This locks the central projection to the base.

Figure 3:
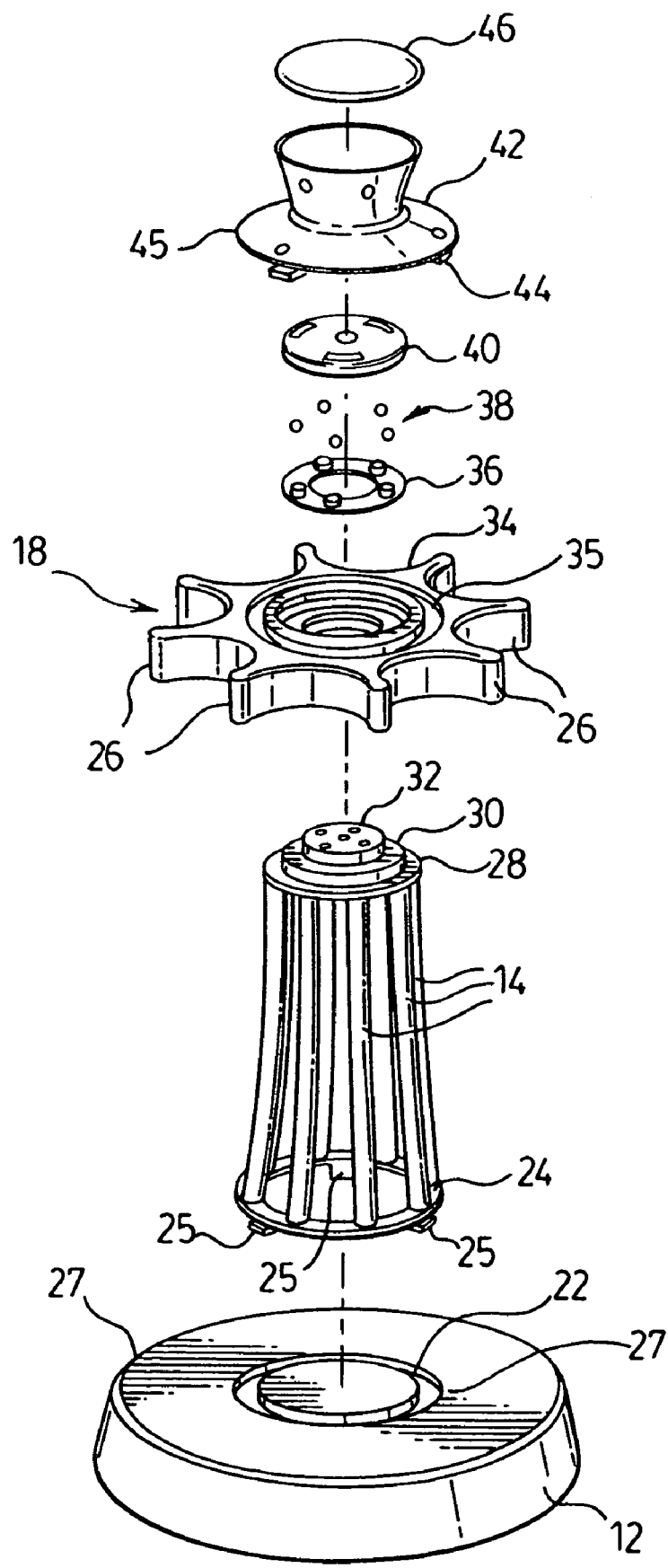
FIG. 3 is an exploded view of the structure of FIG. 2.

Still referring to FIG. 3, another ring 28 attaches the upper ends of the struts 14 together and forms concentric bearing and mounting surfaces 30 and 32.

As it is shown in FIG. 2, the dispensing container holder 18 has a plurality of radial arms 26 forming approximately semi-circular recesses with an indented groove 29 around the upper edge of each recess.

Referring again to FIG. 3, the holder 18 includes a central hub 34, a ballbearing race 36 and ballbearings 38, and a retainer plate 40 which is used to hold the ballbearings, the hub 34 and the structure at the top of the struts 14 together so that the holder 18 can rotate smoothly on the ball bearings to easily rotate the dispensing containers into position.

In the upper surface of the holder 18 is a groove 35 of the same shape as the groove 22 in the base and having lock tab receptacle openings like the openings 27 in the groove 22.

The handle structure includes a base 42 with a flange 45 and lock tabs 44 which fit into the groove 34 and can be rotated to lock the handle in place. A cap 46 is fastened to the upper surface of the handle structure.

When the parts are assembled together, the container holder 18 rotates smoothly on the central projection.

Dispensing Container

Figure 4:
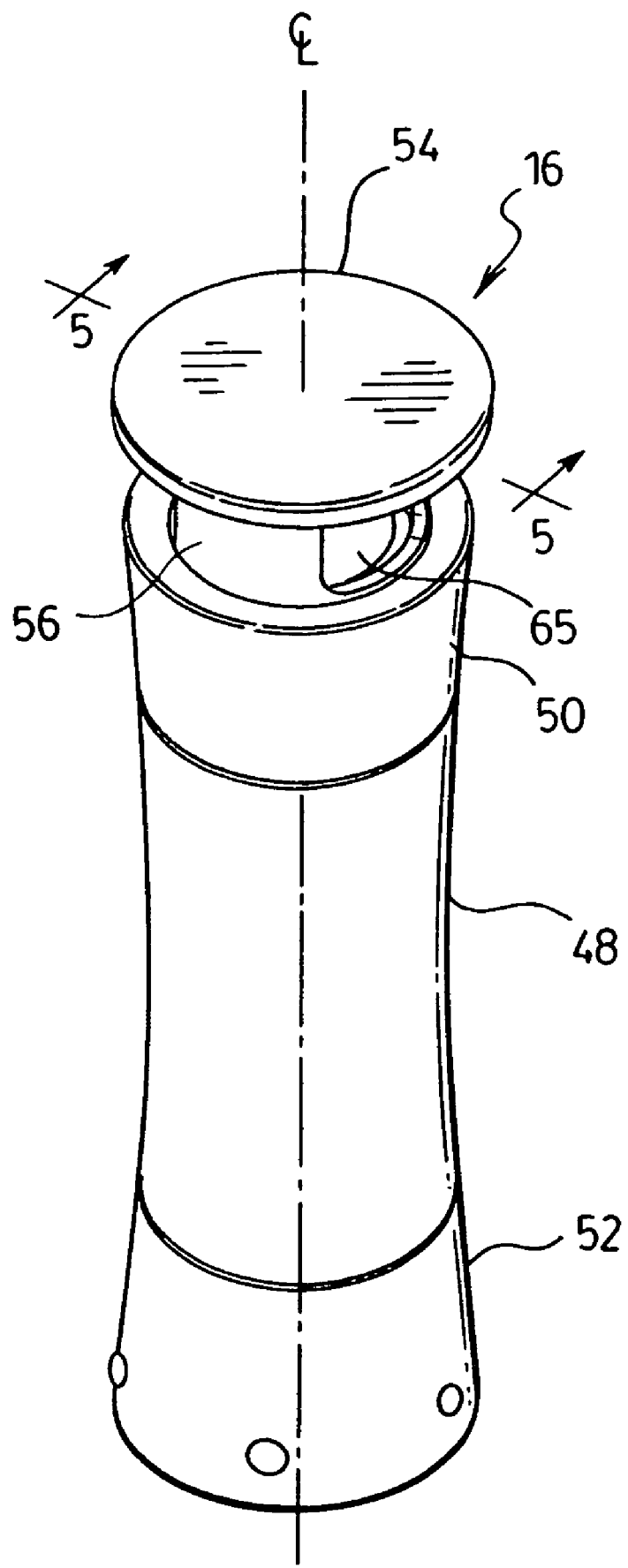
FIG. 4 is a perspective view of one of the containers shown in FIG. 1, with its retractable spout structure raised for use.

Referring now to FIGS. 1 and 4, each of the dispensing containers 16 is of a generally cylindrical shape, with a upper portion 50, a lower portion 52, a transparent side wall portion 48 (FIG. 4), and a cap 54 at the top of the upper portion 50.

As it is shown in FIG. 4, the cap 54 is attached to a slider structure 56 with a dispensing outlet opening 60 when the cap 54 is pulled upwardly as shown in FIG. 4.

When the slider structure is retracted, the opening 60 is closed and the cap 54 covers the entire upper surface of the container.

Figure 5:
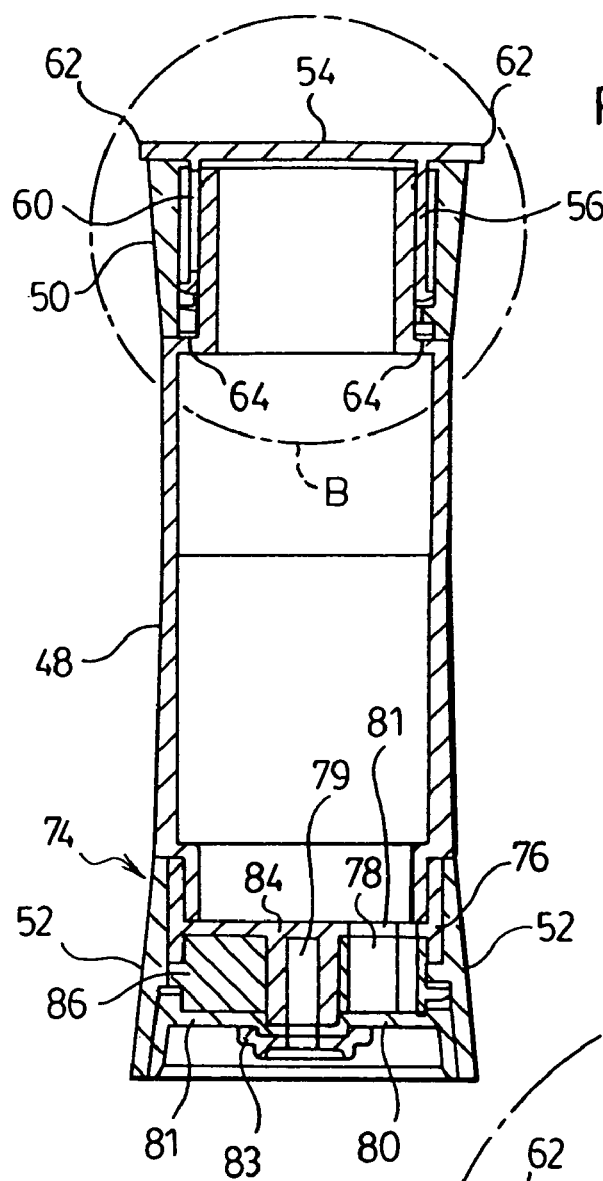
FIG. 5 is a cross-sectional view taken along line 5-5 of FIG. 4, but with the spout structure retracted.
Figure 6:
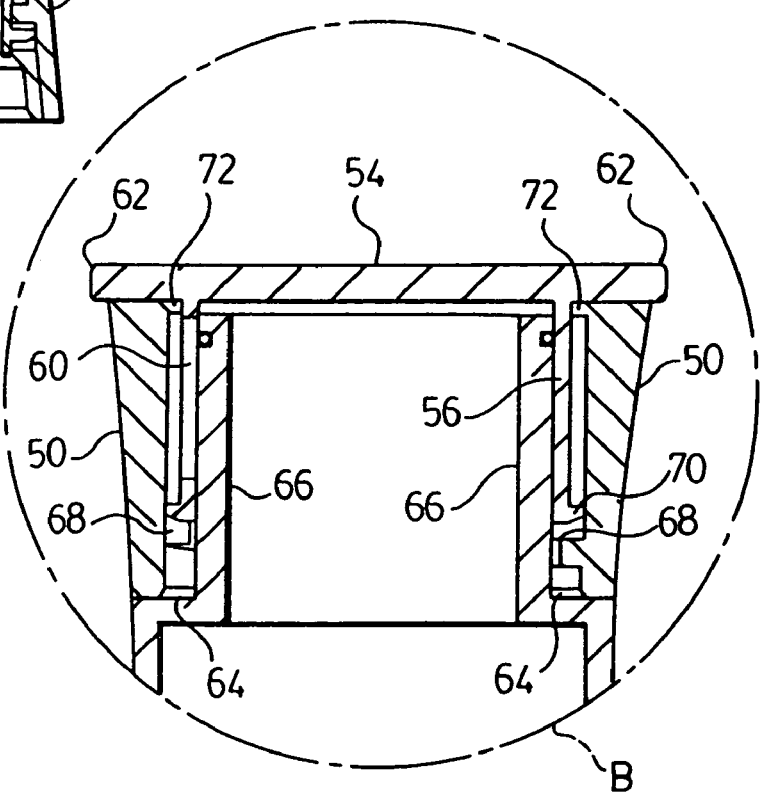
FIG. 6 is an enlarged representation of the portion of the structure of FIG. 5 encircled by the line B.
Figure 7:
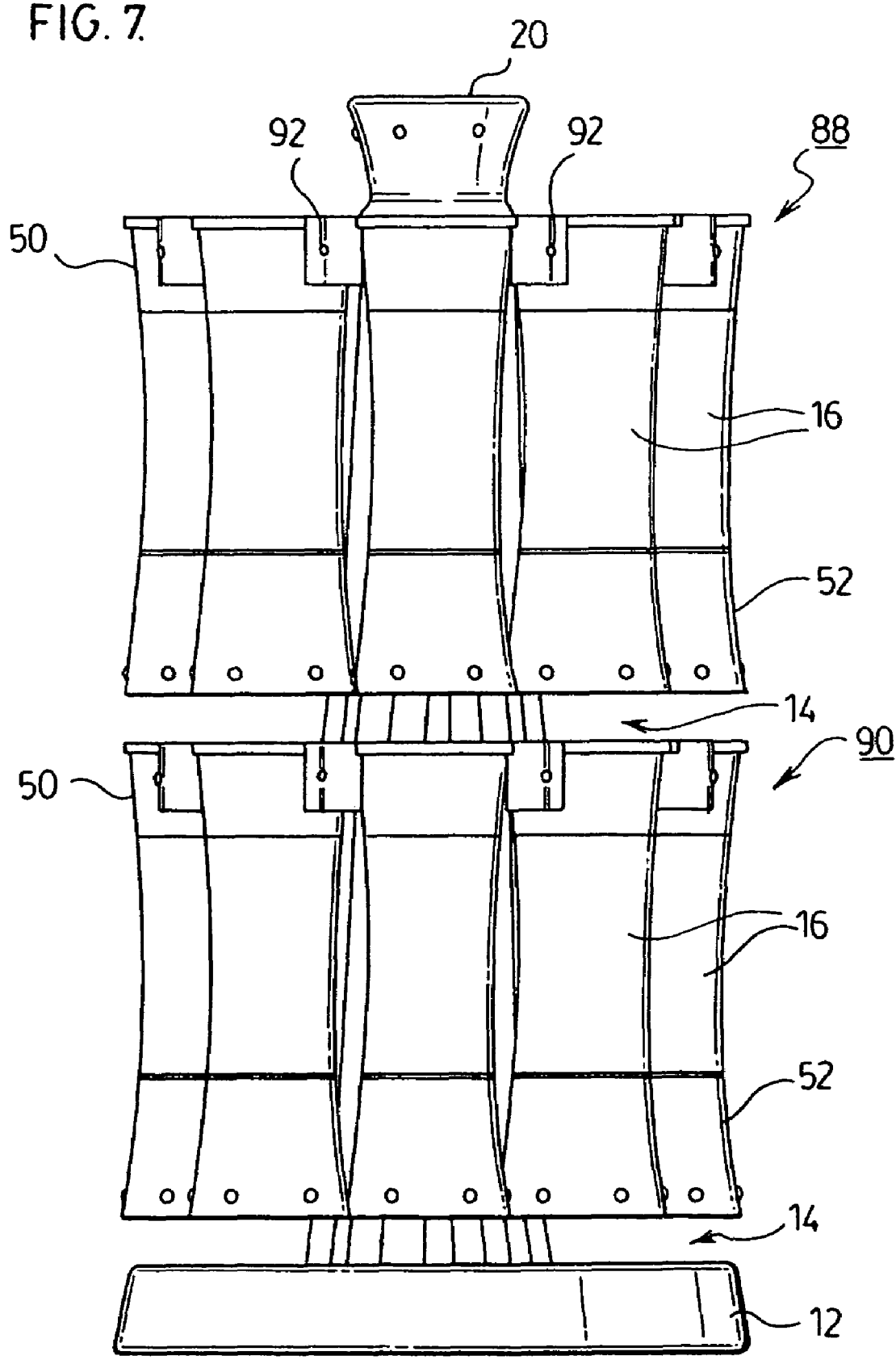
FIG. 7 is a front elevation view of a pair of carousels of the type shown in FIG. 1 stacked and attached together.

The dispensing container construction is shown in greater detail in the cross-sectional views of FIGS. 5 and 6.

As it is shown in FIG. 5, the upper portion of the body of the container is inset as shown at 64. A tapered outer ring 50 is fastened to screw threads 68 (see FIG. 6) to fasten it in place. The diameter of the ring 50 is larger than the diameter of the outer wall 66 of the upper inset portion of the container, so as to form an annular space between the inner surface of the ring 50 and the outer surface of the wall 66.

Into that space is fitted the slider structure 56. The slider structure has an outwardly-extending ridge 70 at its bottom edge which bears against the inner surface of the outer ring 50, and the upper inner edge of the ring 50 has an inwardly-extending flange 72 against which the slider 56 also bears. The container and the carousel preferably are molded of plastic materials with some flexibility.

Thus, when the slider 56 is pulled upwardly, with moderate force, the ridge 70 engages the flange 72 and acts as a detent to hold the cap and the slider in the extended position without allowing the slider to be removed completely from the container body.

Screw threads (not shown) are provided to allow the removal of the cap and the slider from the top of the container completely. This allows ready access to the inside of the container for refilling it, for dipping out contents with a spoon inserted through the large opening thus formed, or for pouring out large quantities of materials.

The structure shown also has the advantage that it minimizes the possibility of condiments entering into the area where the slider slides, and thus avoids interference with the operation due to accumulated matter in the sliding mechanism.

The outer edge 62 of the cap 54 extends beyond the outwardly tapered ring 50. This provides a ridge which fits into the groove 29 in the holding structure 18 (see FIG. 2) to hold the containers in position on the holding structure.

The container-receiving recesses shown in FIG. 2 are made slightly more than half-circles to improve the holding of the containers.

Again referring to FIG. 5, the dispensing mechanism is indicated at 74. The dispensing structure includes a plurality of vertical panels 86 which form separate radial compartments 78 around a central axis 79. A structure 76 with a post 84 is secured in a recess in the lower portion of the housing body. A gate plate 81 is secured by a screw and washer 82 to the post 84. Plate 81 covers the bottoms of the compartments 78 but has a single hole 80 the size of one compartment. The panels 86 are secured to the ring 52. Rotation of the ring 52 moves the compartments 78 sequentially past the outlet opening 80 to dispense the pre-measured contents of the compartments, and past a hole 81 in the upper wall of the structure 76 to re-fill the compartments. The openings 80 and 81 are spaced from one another circumferentially.

The rings 50 and 52 are faired with the remainder of the housing to give it a smooth appearance.

The dispensing mechanism 74 is otherwise well known and will not be further described here. However, it operates to dispense, with each increment of rotation, the contents of one of the compartments 78 so as to deliver a pre-measured quantity of condiment through the bottom opening of the dispensing container.

The container can be used to dispense pre-measured quantities using the dispensing mechanism at the bottom, or the retractable spout can be used to pour the condiments from the container. If desired, other dispensing openings can be used. For example, slits or multiple small holes can be provided in a portion of the slider 56 of the container 16 opposite the opening 60 so as to give the user the option of a shaker outlet or a pouring outlet.

Preferred Dispensing Mechanism

FIGS. 8 through 12 show a preferred dispenser mechanism 90 for use with the dispensing container described above. It is similar to that shown in FIGS. 4-6 above, and the same reference numerals are used for corresponding parts in the two mechanisms.

FIG. 8 is an exploded view of the dispenser mechanism 90. The lower end of the housing body 48 has a outlet extension of reduced diameter having screw threads 92. The structure 76 has internal screw threads (not shown) which mate with the threads 92 so that the structure 76 can be secured firmly in place merely by turning it onto the threads 92.

The ring 52 fits over the outside of the structure 76 and is mounted rotatably on the post 84 by the mechanism which is to be described below.

The dividers 86 forming the compartments 78 are part of a thermoplastic molded structure 106 with five radially-extending projections 108 distributed around the periphery of the ring 106. The projections 108 a have curved edges and are dimensioned so that when the ring 106 is pushed into the ring 52, the projections 108 fit tightly into notches 122 (see FIG. 11) in the ring 52 so that the two parts are snugly engaged with one another. As it is shown in FIGS. 9 and 10, a portion of each projection 108 extends above the tabs 123 which form the notches 122 so as to form recesses between adjacent projections. These are used as detent recesses, as it is explained below.

The additional tapered ring 81 having the dispensing opening 80 has, on its left edge, a notch 96 and two small projections 98 (only one of which is shown in FIG. 8) located 180° from one another.

A stainless steel split ring-shaped spring 100 is positioned between the left edge of the member 81 and the projections 108 on the element 106.

FIG. 12 is a broken-away view of the upper face of the member 81. The upper face is not visible in FIG. 8. The upper face of the ring 81 has a central recess 110 with a flat portion 116 and a short spline 114, as well as a central hole 112. A screw 126 is inserted through the hole 112 and threaded into a hole 120 in the post 84 (see FIG. 8) to hold the components of the dispensing mechanism together.

As it is shown in FIG. 8, the post 84 has a flat portion 120 matching the flat 116 and a spline-receiving axial groove 118 which receives the spline 114. Thus, the tip of the post 84 fits into the hole 110 shown in FIG. 12 so as to tightly secure the part 81 to the post and prevents it from rotating.

A gate member 124 is rotatably attached by means of the screw 126 to the member 81. The gate member 124 can be rotated to cover or uncover the dispensing outlet 80 so that the user of the dispenser can cover the outlet opening when desired in order to aid in keeping the contents of the dispenser fresh.

The stainless steel ring 100 has a pair of opposed notches which mate with the projections 98 on the unit 81 so as to rotatably secure the unit 81 and the spring 100 together.

The spring 100 is split, and has one end 102 which is offset from the remainder of the ring, as it is shown more clearly in FIGS. 9 and 10. The ring 100 serves three different functions.

First, the mechanism makes a "click" when the mechanism goes from one dispensing position to the next one.

Secondly, the mechanism accurately aligns the outlet opening 80 with one of the compartments 78 to empty the contents of that compartment accurately.

Third, it operates as a ratchet mechanism to prevent the rotation of the dispensing mechanism in the wrong direction.

FIG. 9 is a cross-sectional view of an assembly including the rings 52, 106 and 81. The bent portion 102 of the spring 100 is aligned with the notch 96 in the ring 81 so as to give it clearance for moving upwardly and downwardly.

When the outlet opening 80 is correctly aligned with one of the outlet compartments 78, as shown in FIG. 9, the bent portion 102 of the spring 100 fits into the gap between adjacent projections 108. This assures accurate alignment of the outlet opening with each of the compartments in succession.

Additionally, when in this position, the spring portion 102 will prevent rotation of the dispensing mechanism in the wrong direction because the left edge of the portion 102 bears against one of the projections 108. Thus, the spring 102 performs a ratchet function.

FIG. 10 shows the mechanism of FIG. 9 with the ring 80 rotated slightly in a counterclockwise direction. The bent portion 102 of the spring rides up on the top of the next projection 108 until the member 81 has rotated to the next dispensing position, in which the spring end 102 snaps downwardly between adjacent projections 108. When this happens it creates an audible and tactile "click", which lets the user know that he or she has rotated the mechanism correctly to a new dispensing position.

It should be understood that in FIG. 10, the dimensions have been altered somewhat in order to illustrate the principles of the operation of this mechanism.

Typically, the rotation described above dispenses a predetermined amount of material, e.g., ¼ teaspoon.

The member 76 has a transverse wall with an arcuate hole 94. The hole 94 extends circumferentially somewhat less than 180° so that it covers three of the five compartments and leaves two compartments uncovered so as to refill those compartments. The compartment being emptied always is located underneath the wall to prevent the dispensing of any more material than is in one of the compartments.

The mechanism shown in FIGS. 8 through 12 is particularly advantageous in that the construction has a primary wear element, the spring 100, which is made of durable, tarnish-free stainless steel, and helps to insure long life for the dispensing mechanism.

Thus, the foregoing objects have been satisfied by the provision of the invention as described above.

The above description of the invention is intended to be illustrative and not limiting. Various changes or modifications in the embodiments described may occur to those skilled in the art. These can be made without departing from the spirit or scope of the invention.

What is claimed is:

1. A condiment dispenser for dispensing particulate materials, said dispenser comprising:
    (a) an elongated tubular upper body portion with a central longitudinal axis, said body portion being substantially symmetrical about said axis and having an outer wall and a pair of opposed ends and a hollow interior for holding a supply of said materials;
    (b) a top structure for closing said tubular body at one of said ends;
    (c) a tubular bottom structure having a grippable outer wall and defining an outlet opening for selectively dispensing pre-measured quantities of said material through said outlet opening, and supporting said tubular body vertically on a support surface;
    (d) said bottom structure including a rotor mounted to rotate about said longitudinal axis of said body and drivably coupled to said outer wall of said bottom structure;
    (e) a holding structure having a plurality of material holding compartments of a shape matching the shape of said outlet opening;
    (f) said rotor being drivable coupled to create rotation of said compartments relative to said outlet to successively discharge the contents of said compartments downwardly through said outlet;
    (g) said outer wall of said bottom structure being aligned with said outer wall of said tubular body so that said outer walls together form the outer wall for said dispenser;
    (h) said rotor has a substantially frustro-conical shape, with the largest diameter thereof at the bottom edge, said bottom edge defining a support plane for supporting said dispenser vertically on a support surface.

2. A dispenser as in claim 1 in which said top structure includes rotatable attachment/detachment means including screw threads to enable easy attachment/detachment to said body.

3. A dispenser as in claim 2 in which said top structure has a longitudinally-slidable dispensing spout extendable away from and slidable towards said body to close said spout.

4. A dispenser as in claim 1 in which said outer wall of said rotor has an upper end and a lower end, said lower end having a diameter greater than said upper end.

5. A dispenser as in claim 1 including a slidably mounted cover for said outlet opening, said cover being adapted to be slidable between a first position covering said outlet opening and a second position in which it does not cover said outlet opening.

6. A dispenser as in claim 1 including a cover for said outlet opening, said cover being mounted to rotate about said longitudinal axis between a first position covering said outlet, and a second position in which said outlet is not covered.

7. A dispenser as in claim 1 including a ring member with a plurality of detent recesses, an alignment and detent mechanism including said ring and a ring-shaped spring member having an offset portion for fitting successively into each of a plurality of detent recesses, each adapted to align said outlet opening with each of said compartments upon rotation of said spring member relative to said ring member.

8. A dispenser as in claim 7 in which said offset portion is shaped and positioned to snap into each detent recess with a "click".

9. A dispenser as in claim 7 in which said offset portion has an engagement edge for engaging one wall of each of said recesses to prevent rotation of said rotor in one direction.

10. A dispensing container for dispensing comestible materials in pre-measured quantities from said dispensing container comprising:
   a manually holdable container for containing said material;
   a dispensing mechanism secured to said container, said dispensing mechanism having a circular first member with a plurality of radial compartments and a gate member with an outlet opening, said gate member and said first member being rotatably mounted with respect to one another to successively empty said compartments through said outlet opening;
   a detent mechanism comprising a plurality of recesses in a circular array around the periphery of said first member;
   a ring-shaped spring member with an offset portion shaped to fit into said recesses with said outlet opening in alignment with one of said compartments at each of said recesses;
   said ring-shaped spring member being made of stainless steel and having a pair of notches and said gate member having a pair of projections to fit into said notches to hold said spring and said gate member to rotate together relative to said first member; and
   said ring-shaped spring member being shaped to ride up and out of each of said recesses and to be thrust, by spring action, into the next recess with a detectable click.

11. A dispenser as in claim 10 in which said ring-shaped spring member is split and has an edge to engage with a wall of each of said recesses to provide a stop against rotation of said gate member relative to said first member in one direction of rotation.

12. A condiment container with a retractable pouring structure, said container comprising
   a housing body having at least one side wall, a bottom portion and a top portion,
   a pouring structure having a slider structure with a cap, said slider structure being shaped and dimensioned to slidably fit on said top portion so as to be slidable towards and away from said body,
   said slider structure forming a dispensing opening for said housing when said slider structure is positioned away from said body;
   said top portion of said container having a vertical recess shaped to receive and protect said slider from contact with condiments in said container.

13. A container as in claim 12 in which said housing side wall has a rotary lower portion mounted to rotate about the longitudinal axis of said housing,
   a measuring dispensing mechanism in said housing and a dispensing opening in said bottom portion,
   means for drivably coupling said rotary lower portion of said housing to said dispensing mechanism,
   whereby pre-determined quantities of a condiment can be dispensed from the bottom of said housing by rotating said lower portion.

14. A container as in claim 13 in which said container has an opening in the bottom, and said dispensing mechanism includes a plurality of compartments, each containing a pre-measured quantity of said condiment when full, and a gate with a hole and means for moving each compartment in sequence to release the contents thereof through said opening.

15. A container as in claim 12 in which said top portion of said housing has a support structure for supporting said housing in a holding structure with support arms for engagement with said support structure.

16. A container as in claim 12 in which said housing is substantially cylindrical.

* * * * *